United States Patent [19]
Marron

[11] Patent Number: 5,439,329
[45] Date of Patent: Aug. 8, 1995

[54] VALVE MACHINING UNIT

[75] Inventor: Gerald I. Marron, Broomall, Pa.

[73] Assignee: Westinghouse Electric Corporation, Pittsburgh, Pa.

[21] Appl. No.: 220,349

[22] Filed: Mar. 30, 1994

[51] Int. Cl.⁶ .................. B23B 41/12; B23B 35/00
[52] U.S. Cl. ........................ 408/1 R; 82/128; 82/172; 408/83.5; 408/187; 407/175
[58] Field of Search ............... 82/128, 172, 1.2, 1.4, 82/1.5; 408/1 R, 180, 187, 188, 72 R, 79, 80, 83.5, 110, 111, 708, 709; 409/175, 178, 179

[56] References Cited

U.S. PATENT DOCUMENTS

| | | | |
|---|---|---|---|
| 2,040,273 | 5/1936 | Rottler | 408/111 |
| 2,959,109 | 11/1960 | Buchan | 408/187 |
| 4,022,106 | 5/1977 | Kile | 409/178 |
| 4,234,275 | 11/1980 | Clement | 408/709 |
| 4,678,379 | 7/1987 | Sunday | 408/83.5 |
| 5,030,041 | 7/1991 | Marron | 408/83.5 |
| 5,030,046 | 7/1991 | Ricci | 409/175 |

*Primary Examiner*—Steven C. Bishop

[57] ABSTRACT

Methods and apparatus for on-site machining are disclosed. The internal portions of devices such as turbine valves must be machined in place, but present certain areas, such as the valve seat, that cannot be readily accessed from an external surface. The present invention provides methods and apparatus whereby such surfaces can be machined using a fixture to which a milling head or other machine tool is attached. In a preferred embodiment, a mounting plate is provided that contains holes or other features that cooperate with the structure to which the plate attached, thereby providing a rigid base for the machining operation. The present inventions also preferably uses a tool bar that has a cutting head that retracts and swivels. In its initial position the cutting head is swiveled inside the tool bar and the assembly can be inserted into a structure. Once inside, a threaded push rod is turned and manipulated to cause the cutting head to swivel, and then it is locked in place. After machining is complete, the cutting head is unlocked, swiveled and retracted into its original position so that the tool bar can be removed.

7 Claims, 2 Drawing Sheets

VALVE MACHINING UNIT

The present invention relates to methods and apparatus for machining inaccessible surfaces, and more particularly, relates to machining valve seats and other surfaces in a turbine.

BACKGROUND OF THE INVENTION

Moving machinery wears, changing the dimensions of its components. Sufficient wear will seriously degrade the performance of the machinery, thus wear of moving parts must be accommodated or repaired so that the efficiency, reliability and useful life of the machinery are all increased. For example, it is well known that turbine valve seats and other related surfaces wear. These surfaces are restored to their original dimensions either by welding, machining or a combination of these two processes. In order to machine a valve body, it is presently necessary to use three separate machine tools, requiring three different set-up procedures. In addition, current practice for machining a valve body requires that the machinist reach inside the valve body to mount and clamp the cutting tool to the tool bar.

Apparatus that are attached to a steam turbine to machine valve seats are known. U.S. Pat. No. 4,678,379—Sunday discloses an apparatus for machining a stop valve seat ring by mounting a shaft on two fixtures and providing a tool support mounted on the shaft. A motor rotates the shaft and tool support, thereby moving a tool to machine the seat ring. U.S. Pat. No. 5,030,041—Marron discloses a compact boring system for machining the interior surface of steam turbine valves and rotors in the field. The disclosed device also provides a rotatable shaft that mounts within the cylindrical object being machined. The drive system and cutting head are formed as a single unit and can travel axially along the central, rotatable shaft. Both of the aforementioned references are assigned to the assignee of the present invention and are fully incorporated herein by reference.

It would thus be desirable to streamline valve seat machining procedures. The re-machining and restoration of turbine valve seats is the type of operation that is repeated a number of times, thus any savings of time and materials will be multiplied to a great benefit. Therefore, it is an object of the present invention to provide methods and apparatus that reduce the complexity of valve seat machining procedures as well as similar procedures.

SUMMARY OF THE INVENTION

The present invention provides a portable machine for repairing valve bodies or other structures with surfaces that cannot be accessed from an exterior location. The disclosed methods and apparatus eliminate the need for multiple operations; only one set-up is required for all surfaces to be machined. Moreover, the present invention includes a tool bar that allows for external tool mounting, thus simplifying the task of mounting the tool and carrying out the repair. Finally, the apparatus of the present invention mounts over existing structural features such as the valve mounting studs, eliminating the need for their removal. This latter feature is an advantage since components like these studs frequently are seized and break when removal is attempted, requiring further repairs, e.g., drilling and re-tapping the hole in which the stud is mounted.

Thus, it has now been found that the shortcomings of the prior art can be overcome by apparatus made in accordance with the present invention that comprises a milling fixture, a slide and a base plate that has one or more features for attaching the milling fixture to the structure. A machine tool is affixed to the slide and moveable on at least one axis relative to the milling fixture; a tool bar is attached to the machine tool, and a cutting tool is attached to the tool bar. Preferably, the milling fixture further comprises side plates and a back plate removably attached to the slide and the base plate, and the one or more features comprises a bolt circle in the base plate. Preferred embodiments of the present invention use a cutting tool that is attached to a tool bar so that it permits the tool to move from a retracted position to an extended position in order to machine valve seats or other structures that are typically inaccessible. Most preferably, the cutting tool is attached to the tool bar by a swivel and is manipulated by a push rod disposed within the tool bar.

Methods of machining valve bodies and the like are also disclosed. In accordance with the methods of the present invention the base plate of a milling fixture is aligned with a feature such as one or more valve mounting studs that are used to attach the base plate to the turbine. A fixture is attached to the base plate, and a milling head is attached to the fixture, preferably by mounting the milling head to a slide. Most preferably, the milling head is then aligned with the valve or other surface to be machined. After mounting a first tool in the milling head, machining accessible surfaces such as the bonnet bore and sealing face of a valve are undertaken. The methods of the present invention however, also include the steps of removing the first tool from the milling head and mounting a second tool comprising a tool bar and retractable cutter in the milling head so that the valve seat can be machined in the same operation. After lowering the tool bar into the valve, the retractable cutter is moved from a retracted position to a cutting position and the valve seat is machined. In a preferred embodiment, the step of moving the retractable cutter from a retracted position to a cutting position comprises manipulating a push rod disposed within the tool bar. Finally, the retractable cutter is moved from a cutting position to a retracted position and the tool bar raised to a position outside the valve, so that the steps of mounting another tool in the milling head and machining additional portions of a valve can be undertaken.

DETAILED DESCRIPTION OF THE INVENTION

Figures 1, 2:
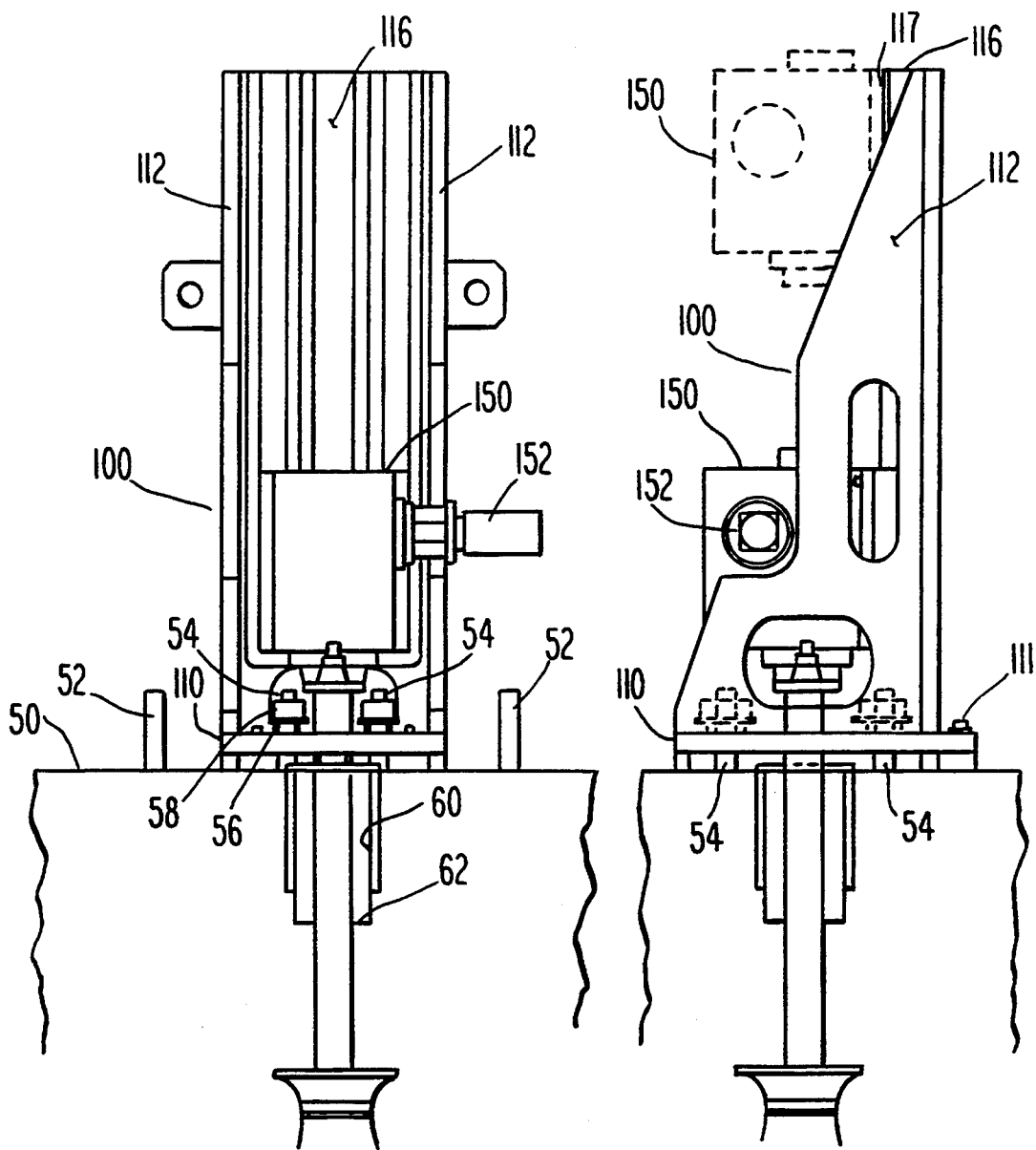
FIG. 1 is a front elevation view of the apparatus of the present invention.
FIG. 2 is a side elevation view of the apparatus illustrated in FIG. 1.

Referring now to FIG. 1, there is shown a valve machining unit 100 made in accordance with the present invention. The valve machining unit 100 mounts to the top of a valve body 50 with a mounting plate 110, the details of which are described below with reference to FIG. 3. The mounting plate 110 is itself fastened in place using certain valve bonnet mounting studs 54, valve bonnet mounting sleeves 56 and valve bonnet mounting nuts 58. The valve machining unit 100 preferably includes a mounting plate 110 that can be aligned with the valve body 50 using leveling and jacking screws 111. As seen in FIGS. 1—2, the mounting plate 110 is attached to a pair of side plates 112 and a back plate 114. Most preferably, the side plates 112 and a back plate 114 are welded together to form a rigid milling fixture structure. Affixed to the back plate 114 is a slide 116. In a preferred embodiment, the slide 116 is a modified version of a standard machine tool slide that is known to those of skill in the art. The slide 116 accepts a carriage 117 to which a machine tool such as a milling spindle 150 and its hydraulic motor 152 is mounted. Thus, as seen in phantom in FIG. 2, the cooperation of the slide 116 and carriage 117 permit the milling spindle 150 to be moved vertically along a single axis while maintaining alignment in other directions. The operation of the slide 116 to accurately mill or bore in this direction is well known to those of skill in the art.

Figure 3:
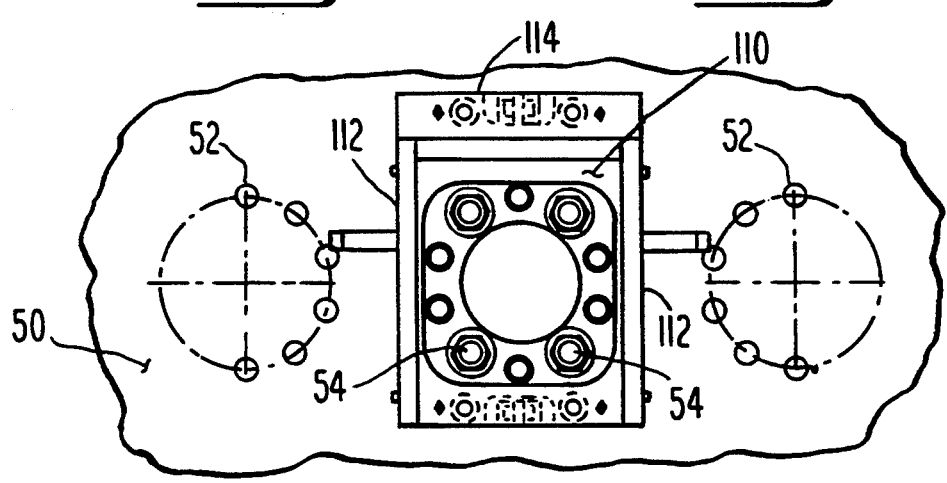
FIG. 3 is a top plan view of a portion of the apparatus illustrated in FIGS. 1-2 showing the mounting plate construction.

Referring now to FIG. 3, further details of the mounting plate 110 are illustrated. For purposes of illustration, the milling spindle 150 and hydraulic motor 152 are not shown. In FIG. 3, it can be seen that the mounting plate 110 includes a bolt circle drilled to correspond to the pattern of valve bonnet mounting studs 52, 54 extending from the valve body 50. Although not to scale, FIG. 3 illustrates a typical bolt circle that is 12.250 inches (31.115 mm) in diameter. By way of further examples, additional preferred bolt circle diameters are 9.50 inches (24.13 mm) and 8.125 inches (20.638 mm). In preferred embodiments of the present invention, the mounting plate 110 is constructed so that it is interchangeably attached to the side plates 112 and back plate 114, e.g., with screws or other removable fasteners, thereby permitting different mounting plates 110 having different bolt circles to be incorporated into a common valve machining unit 100 made in accordance with the present invention. Also shown in FIG. 3 is the placement of the valve machining unit 100 of the present invention relative to a series of valve locations on the valve body 50. As shown, a plurality of valve bonnet mounting studs 52 lie adjacent the valve bonnet mounting studs 54 that are actually used when machining a particular valve. Finally, also shown in FIG. 3 is a preferred placement of the mounting nuts 56. The bolt circle illustrated comprises ten locations that correspond to the valve bonnet mounting studs 54; four of these studs 54 are used to mount the valve machining unit of the present invention, and the symmetrical spacing shown in FIG. 3 is preferred. Thus, the valve machining unit 100 of the present invention is used with the bonnet mounting studs 54 in place, eliminating the need to remove the studs 54, an operation that entails a considerable likelihood that one or more of the studs will be broken.

For machining the valve bonnet bore 60 and valve bonnet sealing face 62 on the top of the valve body 50, a boring and facing head is attached to the machine tool 120. The construction and use of the boring and facing head is familiar to those of skill in the art. When machining a structure that has a bore accessible from an outside surface, such as the bore surface or other accessible surfaces, the cutting tool is simply lowered into the bore to an appropriate depth and the surface is machined.

Thus, in the specific example illustrated herein, after the valve machining unit 100 has been mounted to the valve bonnet mounting studs 54 the milling spindle 50, outfitted with an appropriate cutting tool, is lowered in to the bore using the slide 116 and machining takes place.

As noted above, many internal surfaces and features of a structure require machining but cannot be accessed from the outside of the structure. An example of this situation is the valve seat of a turbine. Conventional practice, described above, requires machining the valve seat from within, requiring a separate fixture and operation that greatly adds to the complexity and cost of the machining operations. However, in accordance with this aspect of the present invention, referring now to FIGS. 4–5, a tool bar 200 used in preferred embodiments of the present invention is illustrated. It has now been found that the tool bar 200 of the present invention can be used to mount and clamp tools from outside the valve (i.e., above the valve) that can effectively machine the valve seat.

Figures 4, 5:
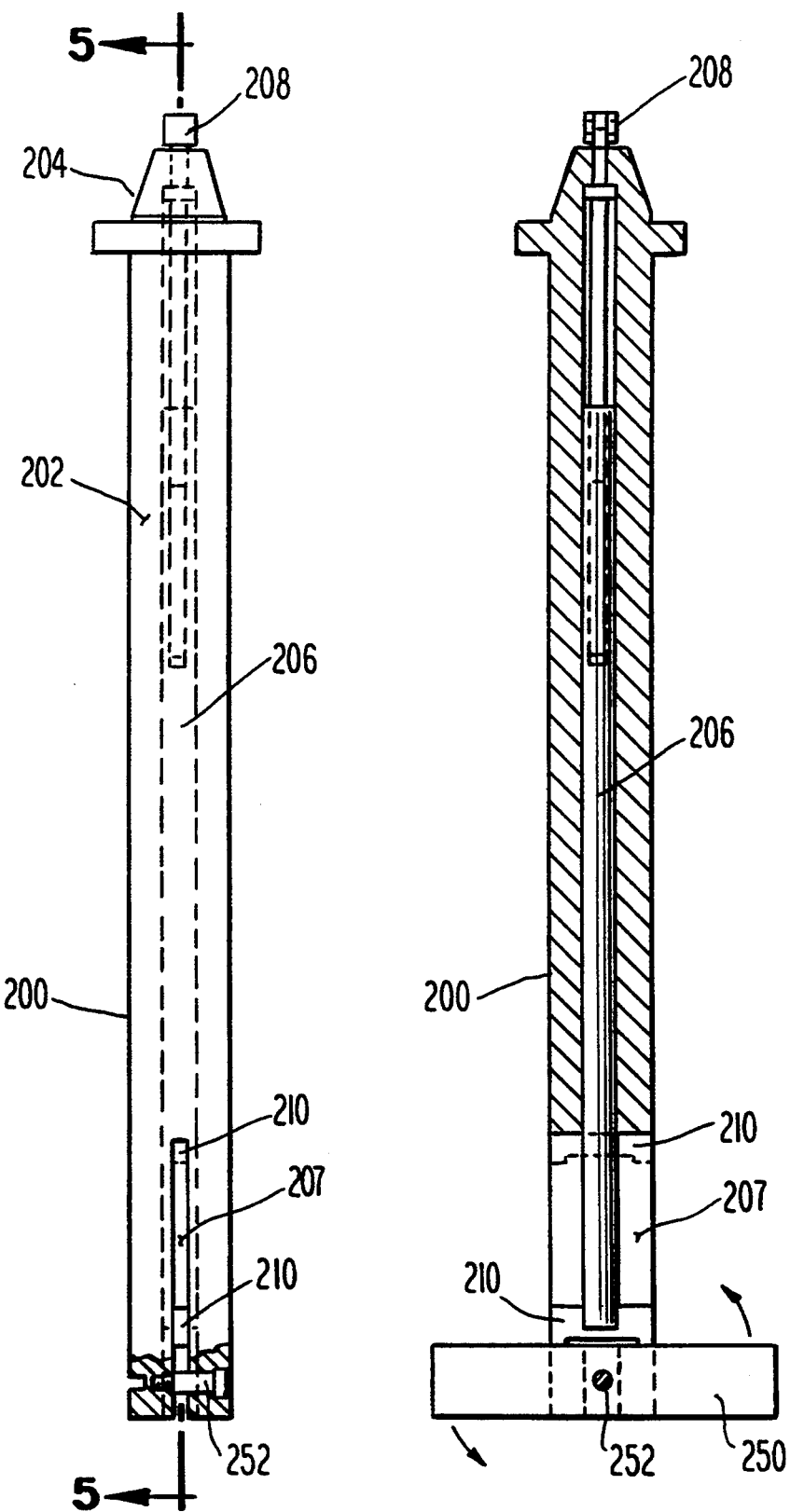
FIG. 4 is a side elevation view of a tool bar used in conjunction with the present invention.
FIG. 5 is a partially sectioned view of the tool bar shown in FIG. 4 taken along line 5—5.

As seen in FIG. 4, the tool bar 200 comprises a tool bar body 202 that is preferably generally cylindrical in shape and has a mounting head 204 at one end that is adapted to cooperate with the milling head or other machine tool 150 described above with reference to FIGS. 1–2. At the end opposite the mounting head 204, the tool bar has a slot 207 to permit manipulation of a cutting tool (not shown in this view). The tool bar body 202 also has a central bore that retains a push rod 206, shown in phantom in FIG. 4 except for the tip 208 extending from the tool bar body 202 that permits the push rod 206 to be manipulated in the manner described below.

Additional features of the tool bar are visible in the cross-sectional view shown in FIG. 5, taken along line 5—5 of FIG. 4. For purposes of illustration, the push rod 206 is not shown in section. As mentioned above, the tip 208 of the push rod 206 is accessible to an operator. The push rod 206 is itself made in two sections that are preferably connected by-a threaded connection. By rotating the tip 208, the length of the push rod 206 can be increased or decreased. As a result of this change in length, a foot 210 that resides in the slot 207 moves between two positions that are best illustrated in FIG. 5.

Referring still to FIG. 5, an outline representing the cutting tool 250 used to machine the valve seat is also visible. It will be understood that the outline of the cutting tool 250 shown is representative of any of the many types or profiles of cutters that are used with the tool bar 200 of the present invention. The cutting tool 250 is mounted to the tool bar 202 on a swivel pin 252. Before the tool bar 200 is inserted in the valve body (not shown in FIGS. 4–5), the cutting tool 250 is retracted within the tool bar body 202, i.e., it is drawn up into the slot 207. During the above-described machining operations, the tool bar 200 is lowered into a valve body from an outside surface, preferably through a guide bushing. Once inside the valve body, the cutting tool 250 is manually swiveled out of the slot 207. This is accomplished by manipulating the tool bar until the cutting tool 250 swivels out of alignment with the push rod 206. By then turning the tip 208, the push rod 206 is used to rotate the cutting tool 250 into a locking position and draw it tightly against the foot 210 so that it is locked in position and can function effectively. Machining operations are then performed with the cutting tool 250 in the position illustrated in FIG. 5.

In order to permit subsequent machining operations, the above-described process is reversed. The push rod 206 is retracted so that the foot 210 moves to the position shown in phantom in FIG. 5. The cutting tool 250 is now free to swivel back into the slot 207 in the tool bar 200 and then the tool bar 200 returns to a profile that can be retracted. Once withdrawn from the valve, the cutting tool 250 can be changed or the entire tool bar 200 replaced with another type of cutter so that additional machining can be performed.

The methods and apparatus of the present invention thus eliminate the need to mount and clamp a cutting tool inside the valve body. This significantly reduces the time required to machine a unit and also reduces the risk of injury during the valve seat machining operation. In the preferred embodiment described above, a single machine, and therefore a single setup, is required to machine the valve seat, bonnet bore and gasket face of a valve body. Because of this feature, accuracy is improved and the time required to machine a unit is reduced.

Although certain embodiments of the present invention have been described herein in detail, these embodiments are meant to describe the invention and do not limit the scope of its application. Upon review of these descriptions, numerous modifications, adaptations and variations will present themselves to those of skill in the art. Thus, in order to determine the full scope of the present invention, reference should be made to the appended claims.

I claim:

1. A method of machining turbine valves comprising the steps of:

aligning a base plate of a milling fixture with one or more valve mounting studs;

attaching the base plate to the turbine using the valve mounting studs;

attaching a fixture to the base plate;

attaching a milling head to the fixture;

mounting a first tool in the milling head;

machining a bonnet bore and sealing face of a valve;

removing the first tool from the milling head;

mounting a second tool comprising a tool bar and retractable cutter in the milling head;

lowering the tool bar into the valve;

moving the retractable cutter from a retracted position to a cutting position; and machining the valve seat of the valve.

2. The method of claim 1, further comprising the steps of:

moving the retractable cutter from a cutting position to a retracted position;

raising the tool bar outside the valve;

mounting a tool in the milling head; and machining additional portions of the valve.

3. The method of claim 1, further comprising the steps of aligning the milling head with the valve prior to the step of machining a bonnet bore and sealing face of the valve.

4. The method of claim 1, wherein the step of attaching the milling head to the fixture comprises mounting the milling head to a slide.

5. The method of claim 1, wherein the step of moving the retractable cutter from a retracted position to a cutting position comprises manipulating a push rod disposed within the tool bar.

6. The method of claim 5, wherein the push rod is comprised of two sections connected by threads and the step of manipulating the push rod comprises rotating the sections to change the length of the push rod.

7. The method of claim 2, wherein the step of moving the retractable cutter from a cutting position to a retracted position comprises manipulating a push rod disposed within the tool bar.

* * * * *